United States Patent [19]

Benjamin et al.

[11] 4,054,678

[45] Oct. 18, 1977

[54] SODIUM ALUMINUM PHOSPHATE

[75] Inventors: Robert E. Benjamin; James C. Anglea; Thomas E. Edging, all of Nashville; Jerry D. Griffith, Franklin; A. J. Patterson, Nashville; Thelton A. Webster, Madison, all of Tenn.

[73] Assignee: Stauffer Chemical Company, Westport, Conn.

[21] Appl. No.: 671,769

[22] Filed: Mar. 30, 1976

[51] Int. Cl.$^2$ ............................................. A21D 2/02
[52] U.S. Cl. ................................. 426/653; 426/563; 423/306
[58] Field of Search ................. 426/563, 653; 423/306

[56] References Cited

U.S. PATENT DOCUMENTS

| | | | |
|---|---|---|---|
| 3,205,073 | 9/1965 | Blanch et al. | 426/563 |
| 3,311,448 | 3/1967 | Blanch et al. | 426/563 |
| 3,411,872 | 11/1968 | Post | 423/306 |
| 3,554,921 | 1/1971 | Kichline et al. | 423/306 |

*Primary Examiner*—Joseph M. Golian
*Attorney, Agent, or Firm*—Charles B. Rodman; Roger S. Benjamin

[57] ABSTRACT

A potassium modified 1:3:8 sodium aluminum phosphate having improved flow characteristics and dust properties particularly suited for refrigerated baking applications.

9 Claims, No Drawings

SODIUM ALUMINUM PHOSPHATE

BACKGROUND OF THE INVENTION

This invention relates to an improved sodium aluminum phosphate for baking applications, and more particularly to a potassium modified 1:3:8 sodium aluminum phosphate with improved flow characteristics and dust properties particularly suited for refrigerated baking applications.

Crystalline sodium aluminum phosphate was first disclosed in U.S. Pat. No. 2,550,490, and an early baking powder composition incorporating SALP was disclosed in U.S. Pat. No. 2,550,491. Since that time, several modifications of sodium aluminum phosphate have been developed which give different reactivities and performance characteristics.

Sodium aluminum phosphate, also known as SALP, is a well known leavening agent in the baking industry. It finds use in baking powders, self-rising flour mixes, preleavened pancake flours and mixes, prepared biscuit mixes, and prepared cake mixes. It is also used as a melt controlling additive in cheese and as a meat binding agent.

Sodium aluminum phosphate is generally employed in baking applications in a finely divided state due to its substantial insolubility. Furthermore, if relatively large particles of sodium aluminum phosphate are used in bakery applications, they can impart an undesirable, gritty property. However, the use of finely divided sodium aluminum phosphate has several inherent deficiencies, the most serious of which is dusting. Sodium aluminum phosphate dust is very light and rapidly permeates the air in food processing plants, creating cleaning and sanitation problems and unsatisfactory working conditions for the employees. An additional problem in handling sodium aluminum phosphate is that the finely divided particles do not flow easily.

Several proposals have been made in the past for improving the physical handling properties of sodium aluminum phosphate, particularly directed to improving flow characteristics and dust properties. These approaches have generally been directed to agglomerating or pelletizing the SALP as disclosed, for example, in U.S. Pat. No. 3,620,972 which utilizes water as an agglomerating medium. Other methods have involved the employment of various binders such as sugars and crystallizing syrups. Still other approaches utilize the addition of small amounts of colloidal $SiO_2$ or tricalcium phosphate to the SALP as flow conditioners to improve physical handling properties.

In one particularly relevant approach, U.S. Pat. No. 3,205,073 to Blanch et al. produces a potassium modified sodium aluminum acid phosphate having decreased hygroscopicity. This result is accomplished by modifying the original sodium aluminum phosphate molecule with the introduction of potassium. The potassium is explained as replacing hydrogen atoms in the crystalline lattice of sodium aluminum phosphate. Blanch et al.'s disclosure indicates the "(a)ddition of potassium may be accomplished either during the reaction of the sodium aluminum phosphate, even before the sodium aluminum phosphateforming reaction, or as a final step after preparation." This improved potassium modified sodium aluminum phosphate is described as having hygroscopic properties wherein it does not increase in weight by more than about 20%, preferably not more than about 10% of its original weight during continued exposure at 35° C. and 75% relative humidity for 140 hours.

In example 8 of U.S. Pat. No. 3,205,073, Blanch et al. disclose the preparation of potassium modified sodium aluminum phosphate by reacting potassium hydroxide along with phosphoric acid and soda ash. It is to be noted that Blanch et al. use an 80% $H_3PO_4$, and show an $Na_2O$ content of 3.53%. The reaction residence time is about 7½ hours, with the reaction product being cooled over a 4 hour period.

An improvement over U.S. Pat. No. 3,205,073 is U.S. Pat. No. 3,411,872 to Post et al. which attempts to improve the flow characteristics of Blanch et al's potassium modified sodium aluminum phosphate by incorporating the potassium ions in a solvent suspension of an alkanol.

The present invention has achieved an improved SALP product characterized by increased density and reduced dusting properties. Among the advantages accrued thereby, are ease of packaging, use of smaller bags that palletize more easily, decreased hygroscopicity and improved flow characteristics. All of these properties enable better handling, in general, especially under conditions of high humidity.

DESCRIPTION OF THE PREFERRED EMBODIMENT

In accordance with the present invention, an improved potassium modified 1:3:8 sodium aluminum phosphate is produced which demonstrates considerable improvement in dust properties and flow characteristics with minimal change in baking performance. These improvements have been accomplished by the controlled substitution of potassium ion for a portion of the sodium ion used in producing the sodium aluminum phosphate.

It appears that when controlled amounts of potassium ion are contacted with a mixture of sodium treated food grade phosphoric acid which is subsequently reacted with alumina trihydrate, $(Al_2O_3 \cdot 3H_2O)$, hereafter referred to as alumina, to produce sodium aluminum phosphate, changes in the crystal structure occur that appear to stabilize the crystal habit of the potassium modified sodium aluminum phosphate. This enables better processing and milling conditions which produce an improved potassium modified sodium aluminum phosphate having a coarser granulation. The improved potassium modified SALP has better flow characteristics and less dust than the prior art compositions, while maintaining reduced hydroscopic properties.

It has also been discovered that when operating within the parameters of the present invention, a change in the cyrstal structure occurs which manifests itself in the form of a doublet pattern as shown by x-ray diffraction powder patterns. This doublet suggests that there may be direct substitution of potassium for some of the sodium within the sodium aluminum phosphate molecule.

In accordance with the present invention, the improved potassium modified sodium aluminum phosphate is produced by contacting food grade phosphoric acid having a concentration of about 85.0 to about 88.0 preferably about 86.0 to about 87.0 weight percent $H_3PO_4$, with a sufficient amount of potassium hydroxide to provide an analysis of about 0.5 to about 1.2, more preferably 0.6 to about 1.0 weight percent of potassium oxide ($K_2O$) in the final potassium modified SALP product. Other potassium containing compounds can also be utilized, such as $K_2CO_3$, $KHCO_3$, $K_3PO_4$ and the like, with the proviso that the anion attached to the potassium not contaminate the reaction media or product.

It appears that the $K_2O$ analysis is a critical factor in helping to achieve those changes in crystal structure of the potassium modified SALP which contribute to the improved flow and dust properties of the product.

The potassium treated phosphoric acid is then contacted with a sufficient amount of sodium carbonate ($Na_2CO_3$) to provide an analysis of about 2.4 to about 3.2, preferably about 2.6 to about 3 weight percent of sodium oxide ($Na_2O$) in the final potassium modified SALP. The $Na_2CO_3$ is generally added in a dry or anhydrous state.

The temperature of the phosphoric acid should be maintained above about 40° C to prevent crystallization of sodium and/or potassium phosphate.

Other sodium containing compounds can also be used, such as NaOH, $NaHCO_3$, $Na_3PO_4$, and the like, with the proviso that the anion attached to the sodium not contaminate the reaction media or product.

The sodium-potassium treated phosphoric acid then has its temperature adjusted to approximately 80° C and is contacted with a sufficient amount of alumina to provide a concentration of about 15 to about 17% by weight, more preferably from about 15.5 to about 16.5% by weight, and most preferably from about 15.8 to about 16.2% by weight of $Al_2O_3$ in the final product. The alumina is generally contacted with the treated phosphoric acid under conditions of slow agitation so that it is uniformly distributed throughout the treated acid.

In a typical operation involving the addition of finely divided alumina, it has been found that for a quantity of approximately 880 gallons of sodium-potassium treated phosphoric acid, approximately 3370 lbs. of alumina can best be added over a 72 minute period at a rate of about 60 lbs. a minute for the first 22 minutes. The temperature then rises to about 120° to about 140° C. Alumina is then added at a rate of about 41 lbs. per minute for the last 50 minutes. The temperature then drops to about 110° C.

The reaction of the sodium-potassium treated phosphoric acid with alumina produces a slurry of potassium modified sodium aluminum phosphate. The reaction generally takes from about 1 to about 3 hours at about 110° C to complete.

The reactor is then cooled to about 60°-75° C for about 15-30 min. and the slurry of potassium modified sodium aluminum phosphate is directed to a Kneadermaster blender or mixer, wherein the material is dried and granulated. In essence, the Kneadermaster mixers or blenders comprise jacketed vessels having an operating pressure of about 80-120 psig of steam. Hot air at a temperature of about 300° C. is fed into the central portion of the vessel. The slurry of potassium modified SALP traverses the length of the Kneadermaster blender, moved along by rotating blades. A particular length of the Kneadermaster is designated as the "wet zone" and is indicative of the distance the slurry traverses in the Kneadermaster before becoming substantially particulate and dry in appearance. Some processes utilize a "short wet zone" or a "regular wet zone". In general, the length of the wet zone can be varied and is determined by the loss on ignition (LOI) required in the feed to the milling step. LOI is a measurement of the % weight loss of a 2 gram sample of the product when ignited in a muffle furnace at a temperature of about 750°-850° C. preferably 800° C for a period of about 10 minutes. The conditions of the Kneadmaster blender are maintained so that the dry potassium modified SALP existing the Kneadmaster has a loss on ignition (LOI) of about 21.0 to about 23.0, preferably about 21.5 to about 22.5 weight percent.

After exiting the Kneadmaster, the potassium modified SALP proceeds to a mill and air classification system wherein the product is milled and classified by particle sise in an air separator to obtain a particle size distribution of about 0.1 to about 5% retained on 60 mesh, about 3 to about 20% through 60, retained on 100 mesh ($-60+100$) and about 9 to about 50% through 100, retained on 140 mesh ($-100+140$). The potassium modified SALP product is then in a commercial form ready to be packaged and shipped. The LOI of the finished potassium modified SALP product is 19.5 to 21.0 weight percent. It is at this point that its flow characteristics and dust properties become of paramount importance, since the product is placed into large bins, packaged and then shipped.

Reduced milling of the granulated potassium modified SALP material results in a relatively coarse product exhibiting desirable baking performance. The "coarse" potassium modified SALP product can be used for new applications in refrigerated doughs and batters and other custom leavening systems as well as an improvement in the usual applications for sodium aluminum acid phosphate products. Processing the improved "coarse" potassium modified sodium aluminum phosphate results in reactor charges that have a more uniform consistency and contain a greater than usual quantity of large, well formed hexagonal crystals. In addition, the material dries quickly and granulates easily. Mill down times for cleaning have been decreased by as much as 100% due to improved milling properties. Increased density of the potassium modified SALP improves packaging operations. Bags and drums are easily filled with sufficient space remaining to make quick and positive closures.

As noted previously, good dust and flow characteristics of leavening acids such as the potassium modified SALP are extremely important in plants which mix and package dry mixes for the preparation of baked products and the like, by using automatic feeders for metering the ingredients. The leavening acid is generally placed in storage bins having funnel-like openings at the bottom. Ideally, it is desired that the leavening acid be removable from the bins at a steady, controlled rate. However, it has been found during the course of removing the leavening acid from the storage bins, intermittent flow sometimes occurs, and on some occasions flow will completely cease. This cessation of flow is called "bridging," and is caused by an open path extending from the bottom of the storage bin to the top of the leavening acid. The problem of bridging can sometimes be ameliorated by the addition of flow agents, or conditioners, such as Cab-O-Sil™ (a form of $SiO_2$ sold by Cabot Chemical Company) or tricalcium phosphate, to the leavening acid. The drawbacks of this approach, however, are that these flow agents are expensive, sometimes unpredictable in the effect they will have on flow characteristics and, unfortunately, can also create dust problems of their own.

The improved potassium modified SALP of the present invention, has significantly improved dust and flow characteristics, in contrast to prior art materials.

One problem in evaluating the flow characteristics of leavening acid candidates is that there does not appear to be an industry-wide standard for quantitatively measuring this property. One method for evaluating flow characteristics of leavening acids that has been found to be satisfactory and quantitatively reproducible, uses the procedure described in Example 1.

EXAMPLE 1

2000 grams of sample are placed in a lever metal funnel having a control chute at the bottom. The funnel is attached to a ring stand at a height of approximately 21 inches above the base measuring from the top of the funnel. The overall height of the funnel is approximately 7 inches, and the funnel has a diameter of 8½ inches at the top opening and a diameter of 1¼ inches at the bottom. The control chute at the bottom opening of the funnel consists of a flat, removable plate for opening and closing. Approximately 6 inches above the top of the funnel, a vibrator is attached to the ring stand. The vibrator can be of any type, for example a Wahl No. 4200 jumbo massage vibrator manufactured by the Wahl Clipper Corporation of Sterling, Illinois. The vibrator is connected to a rheostat so the voltage input can be regulated.

The test for flow properties is conducted by activating the vibrator for one minute at 70 volts with the funnel chute closed. This serves to lightly pack the sodium aluminum phosphate in order to simulate plant conditions. The control chute on the funnel is then opened, allowing the sodium aluminum phosphate to flow out. The voltage of the vibrator is increased to that value necessary to initiate flow. The operation is timed until all material flows out of the funnel. When a bridge starts to form, the power is turned off and the timing stopped. The bridge is noted on the data sheet. The power is then turned on, timing continued, and the voltage increased on the vibrator until sufficient vibration causes the sample to flow again. This process is repeated until all material has flowed out of the funnel. Significant data are the number of bridges and voltage input required during the test to initiate flow, length of time to empty the funnel charge, humidity and temperature.

The following samples were tested in the flow apparatus. A series of 5 runs were conducted for each sample. Mean values were calculated for each series of runs. The samples were also tested with a 1% addition of tricalcium phosphate (TCP) flow conditioner to compare its effects on the flow properties. The tests were conducted at ambient conditions of about 75° F and a relative humidity of about 40.

TABLE I

| | FLOW CHARACTERISTICS SAMPLE NUMBER | | | | | | | | | |
|---|---|---|---|---|---|---|---|---|---|---|
| | 1 | 2 | 3 | 4 | 5 | 6 | 7 | 8 | 9 | 10 |
| Wt. % $P_2O_5$ | 60.00 | 60.10 | 59.60 | 59.50 | 59.60 | 59.50 | 59.70 | 60.35 | 60.25 | 60.40 |
| Wt. % $Al_2O_3$ | 16.20 | 16.30 | 16.80 | 16.70 | 16.70 | 16.40 | 16.45 | 16.10 | 16.00 | 16.14 |
| Wt. % $Na_2O$ | 3.25 | 3.25 | 3.15 | 2.80 | 2.85 | 2.85 | 2.85 | 2.85 | 2.85 | 2.90 |
| Wt. % $K_2O$ | 0.48 | 0.46 | 0.60 | 0.71 | 1.00 | 1.20 | 0.80 | 0.80 | 0.63 | 0.80 |
| LOI% (Product) (Loss in Ignition) | 20.49 | 20.48 | 19.98 | 20.73 | 20.38 | 20.57 | 20.27 | 20.29 | 20.57 | 20.28 |
| NV (Neutralizing Value) | 102.2 | 102.0 | 100.6 | 101.6 | 102.2 | 102.0 | 102.2 | 102.2 | 102.4 | 102.2 |
| Sieving (Wt. %) | | | | | | | | | | |
| +60 mesh | 3.0 | 3.0 | 0.5 | 1.9 | 0.9 | 0.8 | 0.9 | 0.9 | 0.3 | 0.2 |
| −60 +100 mesh | 10.1 | 9.2 | 6.8 | 11.5 | 6.5 | 7.5 | 11.3 | 6.0 | 5.3 | 3.3 |
| −100 +140 mesh | 9.5 | 9.0 | 13.1 | 17.0 | 14.0 | 15.5 | 18.0 | 11.8 | 14.2 | 9.7 |
| Flow Data | | | | | | | | | | |
| Bridges (mean value) | .5 | 1.5 | 3.75 | 1.5 | 1 | 1 | .5 | 3.2 | * | * |
| Voltage (mean value) | 128.8 | 123.8 | 110 | 113.8 | 120 | 125 | 110 | 120 | — | — |
| Time (mean value) | 46.3 | 47.5 | 55 | 55 | 61.3 | 50 | 43.8 | 49 | — | — |
| With 1% Tricalcium Phosphate (TCP) | | | | | | | | | | |
| Bridges (mean value) | 2.4 | 4.8 | 5.8 | .2 | 3.6 | 5.2 .4 | .8 | — | — | |
| Voltage (mean value) | 104 | 105 | 107 | 93 | 101 | 107 | 79 | 100 | — | — |
| Time (mean value) | 94 | 79 | 71 | 59 | 85 | 74 | 46 | 49 | | |

*Vibrator broke - no test results.

EXAMPLE 2

Another criterion in the evaluation of a leavening acid, such as potassium modified SALP, is its tendency to dust. Since the potassium modified SALP is an acidic material, any tendency to dust can lead to irritating conditions where it is handled. Acidic dust is also, of course, an obvious health hazard.

In order to obtain an objective and quantitatively reproducible evaluation of dust properties, an apparatus was constructed which, for simplicity, is called a "dust box". The dust box is constructed of ¾ inch plywood and has inside dimensions of 18 inches × 12 inches. The overall height of the dust box can vary, and in the particular apparatus used, was approximately 52 inches high. For convenience of handling and storage, the box can be made in sections which stack, however, it is required that the sections when connected be lighttight and dust proof. The interior surface of the dust box are painted black. At the top of the dust box is mounted a 2½ inches inside diameter glass or plexiglass supply cylinder in communication with the box, whose purpose is to retain and direct the leavening acid sample into the dust box. A metal cover plate is mounted flush up against the bottom end of the cylinder, and is designed to be easily removable to allow entry of the sample into the dust box as quickly as possible. The cover plate is then immediately replaced. In the lower section of the dust box are mounted a light source and photocell, each on opposite walls to provide a light path. Both the light source and the photocell are installed so that they do not protrude into the dust box and are mounted flush with the interior surface of the sectional walls of the box. Both the light source and the photocell are routinely mounted at about 8 inches above the bottom surface and located at about mid-point of their respective opposite sections of the dust box.

The light source can be a standard flashlight bulb mounted in its reflector and covered with a transparent shield about 1½ inches in diameter. The photocell is a standard 1 inch square photo voltaic cell sold in electronic supply stores and having an active surface of rough glass. The output of the photocell is matched to a suitable chart recorder. In those instances where the photocell output exceeds the required recorder input, proper adjustment and reduction of the voltage can be accomplished by installing a suitable resistor or rheostat across the input wires. Before the test is begun, the voltage input to the light source is adjusted on the chart recorder to indicate 100% light transmission.

The dust test is commenced by filling the supply cylinder with about 500 grams of leavening acid sample. Temperature and humidity are recorded. The supply cylinder cover plate is removed and immediately replaced after allowing the sample to enter the dust box and fall to the bottom, whereupon a cloud of dust is produced which billows up and decreases the percent light transmission.

These changes are automatically recorded on the chart recorder which can be suitably calibrated to record at the rate of about 1 inch per minute. The resulting record estimates the opacity of the initial cloud as a percent transmission of light. It also indicates the rate at which the dust cloud settles or decays, and, after a period of time, the extend of any residual coating of dust on the photocell and light sources. The test duration can vary but is generally stopped after the percent light transmission reaches an equilibrium value, generally after about 10 to 20 minutes. The sooner the equilibrium value is reached, the better the product is judged in terms of its dust properties. Even after equilibrium is reached, a residue of dust can coat the surface of the light source and/or photocell, so that a final equilibrium reading of 100% light transmission generally does not occur. Thus, the residue indicates the extent the particular leavening acid will coat and adhere to a surface during the dust test.

The following samples were tested in the dust box apparatus at ambient conditions of about 74° F. and a relative humidity of about 32. Data has also been recorded on samples where 1% tricalcium phosphate (TCP) was added as a dust conditioner in order to compare the results.

In the Table which follows, data has been recorded for 3 values of dust measurement. These are the peak value, the decay value and the equilibrium value. These values have been measured in terms of percent light transmission (% L.T.). The peak value provides an indication of the maximum dusting effect as a result of the sample falling to the bottom of the dust box and then billowing up in a dust-like cloud. This peak value occurs almost instantaneously. Then, depending upon the physical characteristics of the sample, the billowing effect will drop-off to the decay valve, or continue billowing and then reach an equilibrium value. In general, since the peak values and the decay values occur almost instantaneously, no times have been recorded, except for the duration of the test which generally ends when the equilibrium value is reached.

TABLE II

| | DUST PROPERTIES | | | |
|---|---|---|---|---|
| Sample* | Peak (% L.T.) | Decay (% L.T.) | Equilibrium (% L.T.) | Duration of Test (Minutes) |
| 1 | 16 | 6 | 6 | 5 |
| 2 | 36 | 19 | 4 | 4 |
| 3 | 51 | 21 | 15 | 5 |
| 4 | 33 | 12 | 9 | 5 |
| 5 | 41 | 15 | 12 | 5 |
| 6 | 58 | 30 | 17 | 7 |
| 7 | 50 | 17 | 6 | 10 |
| 8 | 56 | 26 | 11 | 10 |

| | With 1% TCP | | | |
|---|---|---|---|---|
| Sample* | Peak (% L.T.) | Decay (% L.T.) | Equilibrium (% L.T.) | Duration of Test (minutes) |
| 1 | 69 | 47 | 26 | 11 |
| 2 | 79 | 60 | 47 | 10.5 |
| 3 | 82 | 69 | 9 | 11 |
| 4 | 82 | 52 | 25 | 12 |
| 5 | 78 | 43 | 23 | 11 |
| 6 | 77 | 54 | 40 | 11 |
| 7 | 73 | 48 | 16 | 12 |
| 8 | 69 | 36 | 21 | 8 |

*See Table I for analysis

The improved potassium modified SALP of the present invention can be readily characterized by x-ray diffraction powder patterns, by virtue of its distinct crystal and lattice. The x-ray diffraction powder pattern of the potassium modified SALP of the present invention shows a doublet major peak at spacings of 8.61 and 8.46 Angstrom units. The doublet peak begins to appear on samples of the potassium modified SALP of the present invention when the $K_2O$ content varies from about 0.6 to about 1.2%, and when the $Na_2O$ content varies from about 2.6 to about 3% by weight. It is possible that this doublet peak can also appear in a potassium modified SALP wherein the % $K_2O$ and $Na_2O$ are outside the above parameters. However, plant production runs have indicated that above 1.2 weight percent $K_2O$ the product becomes unsatisfactory in terms of its reduced density, increased hygroscopicity, a physical appearance which would detract from its commercial attractiveness and poor dust and flow properties. Listed below are typical x-ray diffraction powder patterns for sodium aluminum phosphate, a potassium modified sodium aluminum phosphate wherein the potassium content and the sodium content are outside the specifications of the present invention, and a potassium modified sodium aluminum phosphate wherein potassium and sodium concentrations fall within the recommended range. It should be borne in mind that the relative intensities can vary from sample to sample, however, spacings listed below come within the 95% confidence level for each sample. The relative intensities were estimated from x-ray film patterns by assigning values ranging from zero for no lines up to 100 for the lines of highest intensity. Slight corrections in values were made to compensate for overall differences of intensity of the powder pattern.

TABLE III

X-RAY DIFFRACTION POWDER PATTERNS

| Compound of Present Invention (2.8±0.2% Na$_2$O, 0.8±0.2% K$_2$O) | | Potassium Modified SALP (3.25% Na$_2$O, 0.46% K$_2$O) | | SALP | |
|---|---|---|---|---|---|
| d.A° | Relative Intensity | d.A° | Relative Intensity | d.A° | Relative Intensity |
|  |  |  |  | 8.70 | 100 |
| 8.61 | 93 ]** | 9.38 | 4 | 7.50 | 10 |
| 8.46 | 100 ] | 8.43 | 100 |  |  |
| 7.33 | 2 | 7.33 | 2 | 4.74 | 5 |
| 4.77 | 1 | 6.75 | 2 | 4.25 | 5 |
| 4.60 | 3 | 5.34 | 4 | 3.67 | 100 |
| 4.35 | 2 | 4.77 | 4 | 3.21 | 40 |
| 4.25 | 4 | 4.60 | 4 | 3.08 | 15 |
| 4.13 | 2 | 4.32 | 1 | 2.99 | 75 |
| 4.05 | 2 | 4.30 | 2 | 2.82 | 30 |
| 3.75 | 10* | 4.25 | 4 | 2.77 | 20 |
| 3.69 | 35 | 4.10 | 4 | 2.73 | 20 |
| 3.63 | 4* | 3.74 | 3* | 2.43 | 25 |
| 3.31 | 2 | 3.68 | 14 | 2.38 | 5 |
| 3.20 | 10 | 3.61 | 2 | 2.22 | 5 |
| 3.15 | 6 | 3.20 | 4 | 2.14 | 15 |
| 3.08 | 5 | 3.15 | 2 | 2.02 | 30 |
| 3.06 | 4 | 3.08 | 2 | 1.91 | 30 |
| 3.00 | 10 | 3.06 | 2 | 1.83 | 5 |
| 2.96 | 3* | 2.99 | 4 |  |  |
| 2.94 | 9 | 2.95 | 3* |  |  |
| 2.90 | 8 | 2.94 | 10 |  |  |
| 2.84 | 10 | 2.84 | 8 |  |  |
| 2.76 | 5 | 2.76 | 2 |  |  |
| 2.70 | 3 | 2.70 | 2 |  |  |
| 2.39 | 4 | 2.39 | 2 |  |  |
| 2.36 | 4 | 2.36 | 2 |  |  |
| 2.13 | 2 | 2.33 | 1 |  |  |
| 2.04 | 2 | 2.12 | 4 |  |  |
| 2.00 | 4 | 2.04 | 4 |  |  |
| 1.90 | 3 | 2.00 | 2 |  |  |
|  |  | 1.90 | 2 |  |  |

*Shoulder
**Doublet

A standard method for evaluating baking performance is the baking powder rate of reaction test (BPRR). In this test, a baking powder is formulated comprising a leavening acid, sodium bicarbonate, starch and water. The purpose of the BPRR test is to observe and measure the rate of carbon dioxide discharge from the baking powder as a means of evaluating the suitability and quality of the leavening acid candidate as a baking acid.

Ideally, there should be a sufficient initial release of carbon dioxide in the baking mix to facilitate mixing and blending of the constituents. The mixture should also be capable of suppressing the release of carbon dioxide until such time as the mix is placed in an oven and heated, whereupon more carbon dioxide is released during baking. The BPRR test is conducted at a temperature of 27° C. ∓ 0.5° C. The potassium modified sodium aluminum phosphate and sodium bicarbonate are used in proportions that are theoretically capable of liberating 200 cc of carbon dioxide.

In general, the baking response of the potassium modified sodium aluminum phosphate shows it to be especially suitable for cakes and frozen batters and doughs. More details regarding reaction rate testing, as well as the apparatus required, are found in *Cereal Chemistry*, Volume 8, pages 423–433 (1933). Table 4 is a tabulation of baking powder rate of reaction for a number of samples.

TABLE IV

BAKING POWDER RATE OF REACTION

| | CO$_2$ Evolution (cubic centimeters) | | |
|---|---|---|---|
| Sample* | 2 Minutes | 4 Minutes | 10 Minutes |
| 1 | 54 | 78 | 118 |
| 2 | 61 | 84 | 122 |
| 3 | 52 | 71 | 103 |
| 4 | 58 | 93 | 126 |
| 5 | 57 | 77 | 107 |
| 6 | 67 | 90 | 122 |

TABLE IV-continued

BAKING POWDER RATE OF REACTION

| | CO$_2$ Evolution (cubic centimeters) | | |
|---|---|---|---|
| Sample* | 2 Minutes | 4 Minutes | 10 Minutes |
| 7 | 62 | 80 | 108 |
| 8 | 64 | 83 | 112 |
| 9 | 64 | 87 | 123 |
| 10 | 60 | 79 | 106 |

*See Table I for analysis

Humidification tests were run on a number of samples to determine the amount of moisture pickup over an extended period of time in order to give an indication of the hygroscopicity of each sample. In the Table below, data is given for a number of samples exposed for a period of 140 hours at a temperature of 35° C. and 75% relative humidity.

TABLE V

| Sample* | % Weight Increase |
|---|---|
| 1 | 17.5 |
| 2 | 17.5 |
| 3 | 17.8 |
| 4 | 20.2 |
| 5 | 20.4 |
| 6 | 21.8 |
| 7 | 15.9 |
| 8 | 15.4 |

*See Table I for analysis

It has been theorized that bulk density measurements can provide an indication of the extent of agglomeration occurring in sodium aluminum phosphate. The basis for this theory is that agglomerated particles would manifest greater density values than the unagglomerated particles. With this in mind, the bulk densities of a number of samples were measured. The results tabulated below in Table IV would appear to substantiate that the improved potassium modified SALP of the present invention has a greater degree of agglomeration as manifested by the bulk density values.

TABLE VI
Bulk Densities

| Sample* | Bulk Density lb./ft.$^3$ | |
|---|---|---|
| | Loose | Packed |
| 1 | 42 | 60 |
| 2 | 42 | 65 |
| 3 | 55 | 80 |
| 4 | 55 | 78 |
| 5 | 55 | 78 |
| 6 | 46 | 72 |
| 7 | 58 | 81 |
| 8 | 55 | 79 |
| 9 | 51 | 74 |

*See Table I for analysis

What is claimed is:

1. A process for the preparation of an improved potassium modified 1:3:8 sodium aluminum phosphate which comprises:
   a. contacting, at a temperature above 40° C., a food grade phosphoric acid having a concentration of about 85.0 to about 88.0 weight percent $H_3PO_4$ with a sufficient amount of potassium ion to provide an analysis of about 0.5 to about 1.2 weight percent $K_2O$ in the final product, and a sufficient amount of sodium ion to provide an analysis of about 2.4 to about 3.2 weight percent of $Na_2O$ in the final product;
   b. contacting the sodium-potassium treated phosphoric acid with a sufficient amount of alumina to provide a concentration of about 15 to about 17% by weight $Al_2O_3$ in the final product;
   c. cooling the slurry of potassium modified sodium aluminum phosphate thereby formed to a temperature varying from about 60 to about 75° C;
   d. drying and granulating the potassium modified sodium aluminum phosphate;
   e. milling and classifying the potassium modified sodium aluminum phosphate to obtain the following particle size distribution:
   from about 0.1 to about 5% retained on 60 mesh;
   from about 3 to about 20% through 60 on 100 mesh;
   from about 9 to about 50% through 100 on 140 mesh.

2. The process of claim 1 wherein said potassium ion is provided by a compound selected from the group consisting of potassium hydroxide, potassium carbonate, and potassium phosphate.

3. The process of claim 2 wherein said potassium compound is potassium hydroxide.

4. The process of claim 1 wherein said sodium ion is provided by a compound selected from the group consisting of sodium carbonate, sodium hydroxide, sodium bicarbonate and sodium phosphate.

5. The process of claim 4 wherein said sodium compound is sodium carbonate.

6. The process of claim 1 wherein the reaction of Step (b) lasts for about 1 to about 3 hours.

7. The process of claim 1, Step (d) wherein the potassium modified sodium aluminum phosphate has a loss on ignition of from 21.0 to about 23.0 weight percent.

8. The process of claim 1, Step (a) wherein the anaylsis of $K_2O$ varies from about 0.6 to about 1.0 weight percent.

9. An improved potassium modified 1:3:8 sodium aluminum phosphate composition formed from the process of claim 3, having the following analysis:
   0.8 ± 0.2 weight percent $K_2O$,
   2.8 ± 0.2 weight percent $Na_2O$, and
   16.0 ± 1.0 weight percent $Al_2O_3$ in the final product, and which exhibits X-ray diffraction lines of major intensity at d-spacings of approximately 8.61, 8.46 and 3.69 angstroms, and has the following sieving characteristics:
   From about 0.1 to about 5% retained on 60 mesh;
   From about 3 to about 20% through 60, on 100 mesh;
   From about 9 to about 50% through 100, on 140 mesh.

* * * * *